United States Patent [19]

Baker

[11] Patent Number: 5,574,321

[45] Date of Patent: Nov. 12, 1996

[54] INTEGRAL REFRIGERATOR MOTOR FAN BLADES

[75] Inventor: Gerald N. Baker, Florissant, Mo.

[73] Assignee: Emerson Electric Co., St. Louis, Mo.

[21] Appl. No.: 237,780

[22] Filed: May 4, 1994

[51] Int. Cl.[6] .............. H02K 7/14; H02K 11/00
[52] U.S. Cl. ............ 310/67 R; 310/68 R; 310/62; 310/63; 310/42
[58] Field of Search ............... 310/62, 63, 67 R, 310/68 R, 42; 29/596

[56] References Cited

U.S. PATENT DOCUMENTS

| | | | |
|---|---|---|---|
| 4,015,182 | 3/1977 | Erdman | 318/334 |
| 4,306,419 | 12/1981 | Schwartz | 62/6 |
| 4,459,519 | 7/1984 | Erdman | 318/254 |
| 4,668,898 | 5/1987 | Harms et al. | 310/67 R |
| 4,883,982 | 11/1989 | Forbes et al. | 310/62 |
| 4,955,791 | 9/1990 | Wrobel | 310/67 R |
| 5,278,468 | 1/1994 | Escaravage et al. | 310/68 R |
| 5,281,886 | 1/1994 | Ohta | 310/67 R |
| 5,363,003 | 11/1994 | Harada et al. | 310/67 R |

FOREIGN PATENT DOCUMENTS

| | | | |
|---|---|---|---|
| 0565312 | 10/1993 | European Pat. Off. | H02K 7/14 |
| 2-303344 | 12/1990 | Japan | 310/63 |

OTHER PUBLICATIONS

*Mitsubishi Axial-Flow Fans, Setting New Standards of Performance and Quietness*, E-C4615-F NK-9107 printed in Japan (ROD), Revised publication, effective Jul. 1991.

*Papst Cooling Fans and Blowers*, Papst Mechatronics Innovative motors and fans, L500a USA, printed in Germany, 1990/1991.

*Tubeaxial Fans Catalog* T9/3, ebm Industries, Inc., ©ebm Industries, Inc. 1989USA.

Primary Examiner—Clayton E. LaBalle
Attorney, Agent, or Firm—Polster, Lieder, Woodruff & Lucchesi

[57] ABSTRACT

A dynamoelectric machine in the preferred form of a permanent magnet motor has an integral blade assembly associated with the rotor for the motor. The motor includes an enclosure with which the blade assembly mates. The blade structure/housing combination provides a labyrinth moving seal to protect the motor and associated motor control. The blade assembly and enclosure preferably are constructed from nonconductive material and provide a fully electrically insulated motor-fan assembly, which eliminates the need for certain grounding requirements. Blade construction is optimized easily to reduce audible sound in operation use. A method of assembly for a motor provides an integral blade assembly housing arrangement.

21 Claims, 5 Drawing Sheets

INTEGRAL REFRIGERATOR MOTOR FAN BLADES

RELATED APPLICATIONS

This application is related to copending application Ser. No. 237,782/08, filed May 4, 1995, Hoemann et al., High Efficiency Power Supply and Control for Brushless Permanent Magnet Motor; Ser. No. 240,633/08, filed May 4, 1994, Baker et al., Brushless Permanent Magnet Condenser Motor for Refrigeration; Ser. No. 240,629, filed May 11, 1994, Baker et al., Electrical Connection of Printed Circuit Boards to Line Leads on Brushless Permanent Magnet Refrigeration Motors; and Ser. No. 240,635/08, filed May 11, 1994, May, et al., Integral Connector and Motor Housing, assigned to the assignee of the present invention, the disclosures of which are incorporated herein by reference.

BACKGROUND OF THE INVENTION

This invention relates to dynamoelectric machines in the form of electric motors. While the invention is described with particularity with respect to brushless permanent magnet motors (BPM), those skilled in the art will recognize the wider applicability of the inventive principles disclosed hereinafter.

There has been, and continues to be, a movement toward high operating efficiency devices in electrical designs. That movement includes a move by appliance manufacturers to provide high efficiency consumer appliances for general use. Certain improvements in such appliance efficiency are more obvious than others. For example, the ubiquitous household refrigerator has at least three electric motors associated with it. They include a hermetic compressor motor which drives the compressor for the refrigerant system, an evaporator motor, and, in many refrigerators, a condenser motor. The general operation of the refrigeration system of the conventional refrigerator is well known. The compressor moves the refrigerant from the evaporator into the condenser. It then forces the refrigerant back to the evaporator through an expansion valve. Refrigerant vapor leaves a compressor at high pressure. As it flows into the condenser, the high pressure causes the vapor to condense back to liquid refrigerant. As this happens, the vapor gives out heat, making the condenser warm. The condenser is at the back of the refrigerator, and heat flows into the air around the refrigerator, often with the aid of the aforementioned condenser fan. The refrigerant leaves the expansion valve at low pressure, causing it to evaporate inside the pipe and get cold. The evaporator is inside the refrigerator and heat flows into the evaporator, making the refrigerator cold. Again, a fan is used to force air over the evaporator and distribute the cool air throughout the refrigerator interior.

Refrigerators operate day and night and because of that operation, their operation cost is relatively substantial, even when attempts are made to increase their efficiency. Recently, there has been an industry-wide effort by refrigerator OEMs (original equipment manufacturers) to raise the level of refrigerator efficiency.

As will be appreciated by those skilled in the art, brushless permanent magnet motors in operational use offer the best efficiency presently known for electric motors in general use, although switched reluctance motors (SRM) and controlled induction motors (CIM) often are configured to achieve substantially equivalent performance. In the size of the motor of this invention, the brushless permanent magnet motor was found to offer the best engineering solution. A brushless permanent magnet motor is similar to other motor types in that it includes a stator assembly having a core of laminations formed from suitable magnetic material. The core has winding receiving slots formed in it. The rotor assembly commonly is the component that distinguishes a permanent magnet motor from other motors. Unlike other conventional motor constructions, a BPM rotor has at least one permanent magnet associated with it. The motor may be either of a conventional design, in which the stator assembly has an axial opening through the core for reception of the rotor assembly, or the motor can be a so called inside out motor, which has the rotor assembly outboard of the stator.

While brushless permanent magnet motors offer higher efficiencies, they require an electronic circuit for applying electrical energy to the motor windings for proper operation of the motor. The control circuits required for motor operation often make application of the permanent magnet motor economically unjustifiable.

Condenser and evaporator fans in refrigerators conventionally are small and low cost designs. The low cost design of these motors commonly equates with a relatively low efficiency design. We have found that the lower efficiency evaporator or condenser motors can be replaced with more efficient permanent magnet motors when the assembly and construction techniques disclosed hereinafter are employed for and in the motor design, and the motor control functions are accomplished in accordance with the various disclosures incorporated by reference. One of the objects of this invention is to provide an economically producible permanent magnet condenser motor.

Another object of this invention is to provide a motor design which can be incorporated into a variety of applications.

Another object of this invention is to provide a motor construction which has an integrally formed blade assembly.

Another object of this invention is to provide a motor blade assembly which is electrically insulative.

Yet another object of this invention is to provide a motor blade combination which is protective of the motor and associated controls.

Still another object of this invention is to provide an integral fan blade design which can be easily modified for different customer requirements.

Other objects of this invention will be apparent to those skilled in the art in light of the following description and accompanying drawings.

SUMMARY OF THE INVENTION

In accordance with this invention, generally stated, a dynamoelectric machine includes an enclosure and an associated blade assembly which inter-connect with one another to provide a labyrinth seal for protecting the electrical components of the motor control design, and which eliminate certain grounding requirements by providing a fully electrically isolated motor and fan assembly. In the preferred embodiment, the dynamoelectric machine is an inside out permanent magnet motor. The fan blade assembly includes a central hub, sized to receive the motor rotor. The hub is attached to the motor rotor for rotation with it. The assembly includes a plurality of fan blades which extend outwardly from the hub. The motor assembly includes an enclosure with which the hub mates in the moving seal relationship. A method of assembly for a motor is disclosed which permits motor construction without use of threaded fasteners and which promotes automated assembly of the motor structure.

DESCRIPTION OF THE PREFERRED EMBODIMENT

Figure 1:
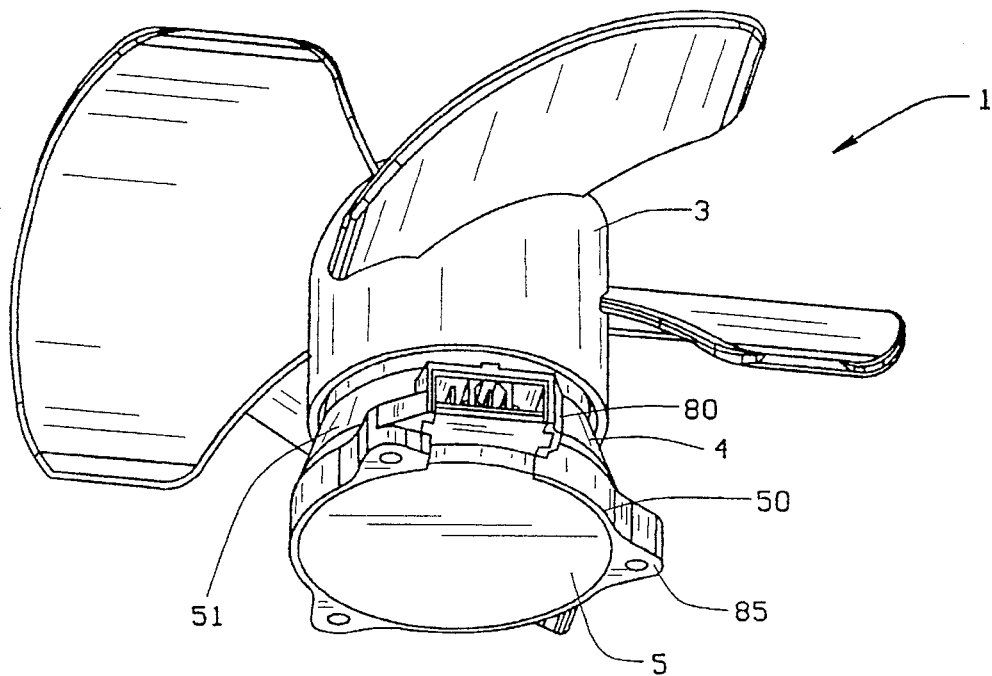
FIG. 1 is a bottom view, in perspective, of one illustrative embodiment of integral blade and motor assembly of this invention.
Figure 2:
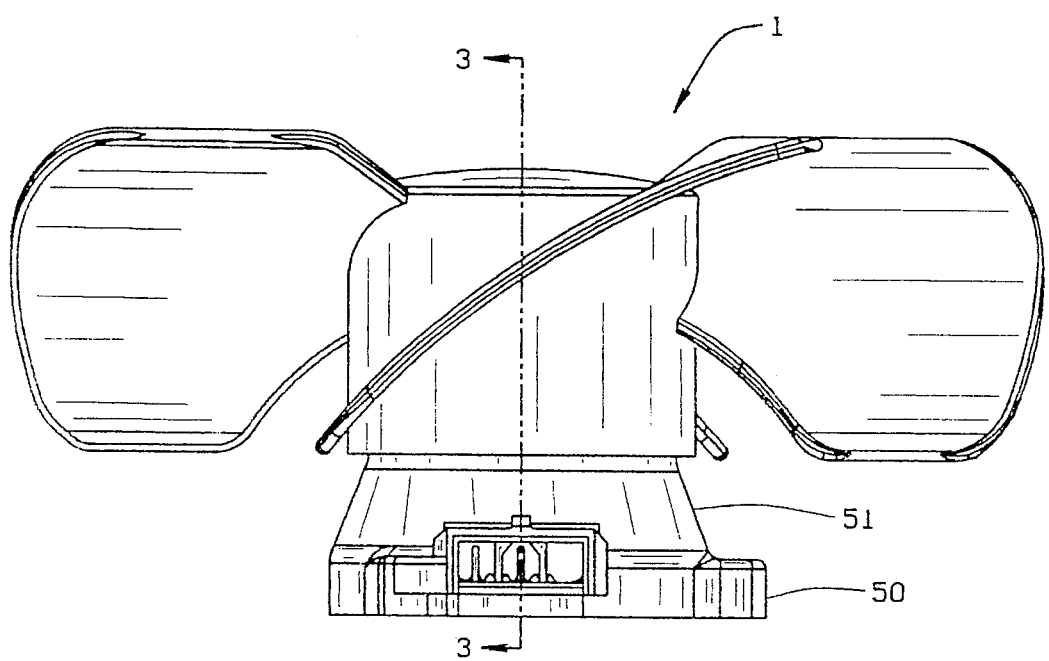
FIG. 2 is a side view thereof.

Referring now to FIG. 1, reference numeral 1 indicates one illustrative embodiment of motor assembly of this invention. The motor 1 includes an integral fan blade assembly 3, an enclosure 4, and an end cover 5. Motor assembly 1 also includes a stator assembly 7 and a rotor assembly 8, a motor connection assembly 9, a motor control assembly 10, component parts of which are best observed in FIGS. 3 through 8.

Figure 5:
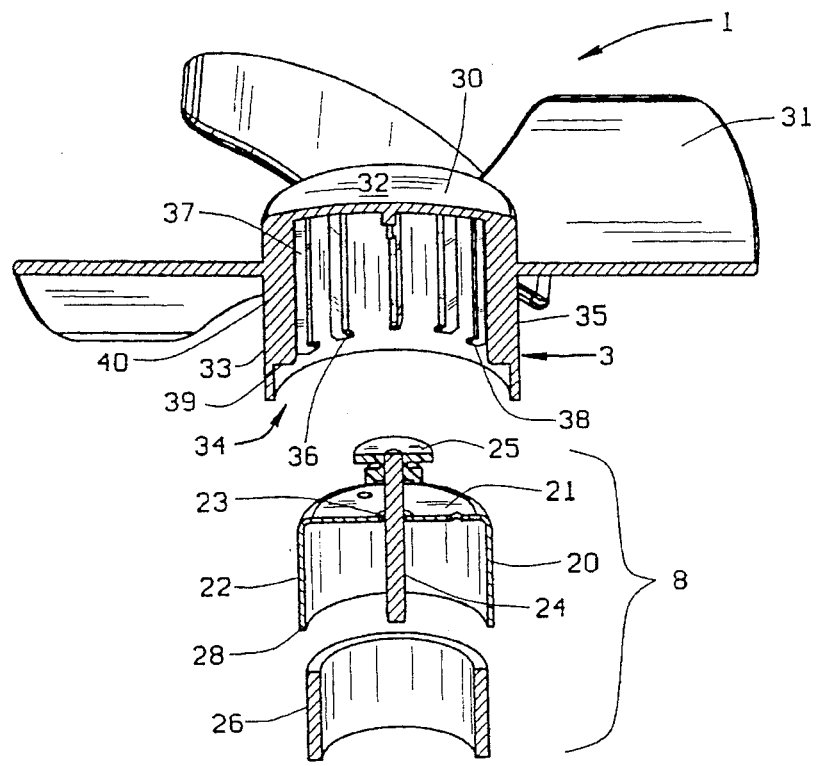
FIG. 5 is an exploded view of the motor shown in FIG. 1.
Figure 5:
Figure 5:
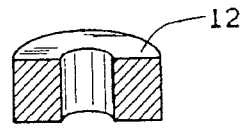
Figure 5:
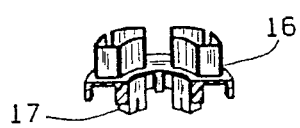
Figure 5:
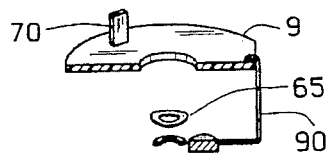
Figure 5:
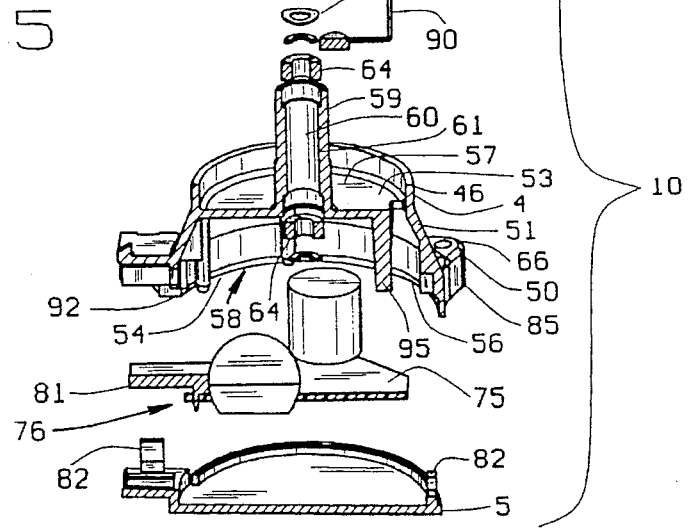
Figure 6:
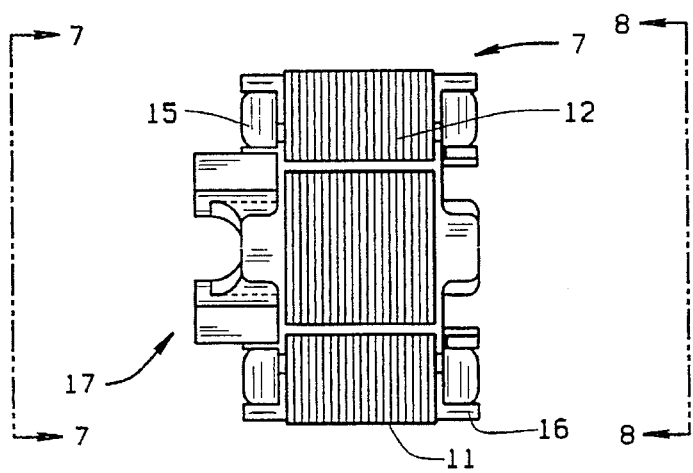
FIG. 6 is a view inside elevation of a stator assembly for the motor shown in FIG. 1.
Figure 7:
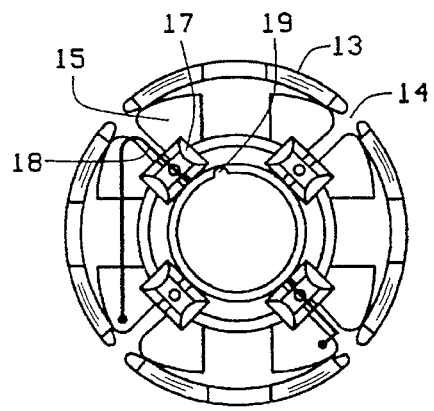
FIG. 7 is an end view taken along the line 7—7 of FIG. 6.
Figure 8:
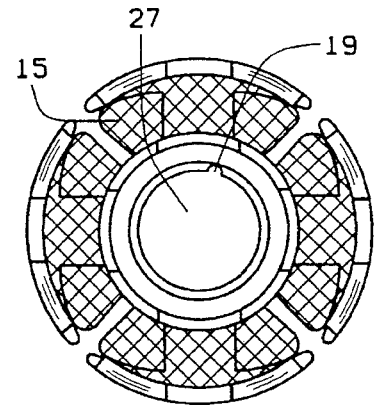
FIG. 8 is an end view taken along the line 8—8 of FIG. 6.
Figure 9:
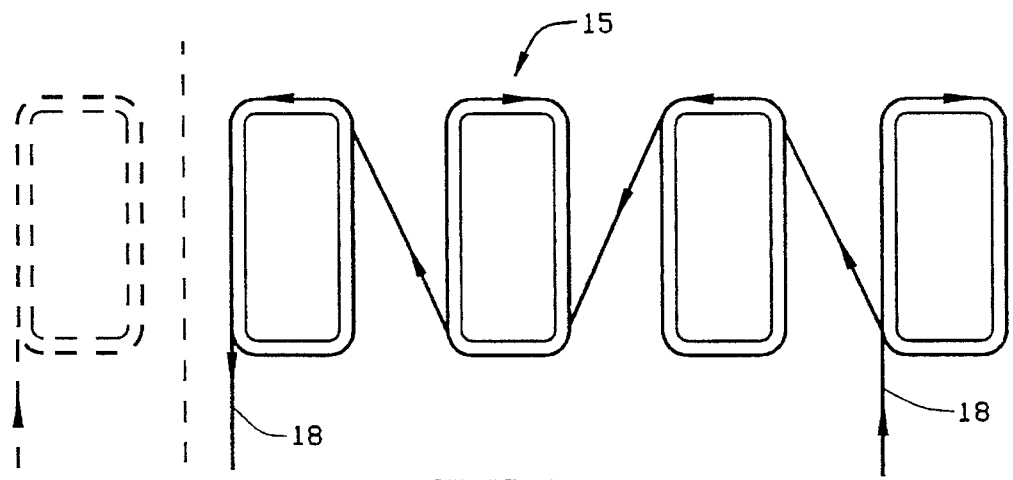
FIG. 9 is a diagrammatic view of the winding employed in conjunction with the motor of FIG. 1.

As shown in FIG. 6, the stator assembly 7 includes a core 12 constructed from a plurality of individual laminations 11 formed from suitable magnetic material. For ease of illustration, the core 12 is illustrated in solid form in FIG. 5. Those skilled in art will recognize that the core assembly may have a plurality of shapes or forms in other embodiments of the invention. The core 12, as indicated, is formed from a plurality of stator laminations 11. The laminations 11 are constructed by any conventional method. For example, the laminations 11 may be punched individually and assembled in the core, or the laminations may be constructed in a continuous strip as described, for example, in U.S. Pat. No. 4,613,780, a manufacturing process long used for alternator cores. In any event, the laminations have a location notch 19 formed in them, and define a central opening 27 in their core 12 assembled relationship.

The laminations 11 define a plurality of physical poles 13, each of which are separated by a winding receiving slot 14. A winding 15 is positioned or wound over the individual poles 13 in a conventional manner. Prior to such placement, however, molded core insulation 16 is placed on the core 12. Insulation 16 may be constructed in any convenient way. For example, the insulation 16 may be formed by molding it in situ on the core, so that the winding 15 may be placed in insulative relationship to the core 12. In the embodiment illustrated, the insulation 16 is formed separately and merely inserted into the core in a friction fit. The stator assembly 7 of the present invention is unique in that suitable winding termination means 17 is formed on at least one of the respective ends of the insulation 16 for purposes generally described hereinafter, and specifically described in copending application, Ser. No. 240,633/08, filed May 11, 1994, the disclosure of which is incorporated by reference. It is here noted that at least one of the ends 18 of a particular phase of the winding 15 is engaged in and by the termination means 17. The winding 15 is shown in cross hatch in FIG. 8 merely for illustrative purposes.

Rotor assembly 8 includes a cup 20 having a top wall 21 and an annular side wall 22. The top 21 has a central opening 23 formed in it, sized to receive a shaft 24. Shaft 24 is attached to cup 20 by any convenient method. In the preferred embodiment, the shaft 24 is permanently attached to the cup 20 along the top 21 by casting a suitable material about the shaft and cup 20, as illustrated at 25. Casting is accomplished in a mold, not shown, which holds the proper relationship between the shaft and cup until the material sets and thereafter maintains the relationship. Preferably, the material is zinc, although other materials may be employed, if desired.

At least one permanent magnet 26 is formed to fit along the side wall 22 of the cup 20. Magnet 26 is attached to side wall 22 by any convenient method. Suitable epoxy adhesive works well, for example. The number, placement, and arcuate design of magnet 26 depend in large measure on the electrical property design requirements that the motor assembly 1 is intended to accomplish. Details of the control features and the circuit required for that control are described in the aforementioned application, Ser. No. 237,782/08, the disclosure of which is incorporated herein by reference.

Fan blade assembly 3 includes a central hub 30 having a plurality of fan blades 31 extending outwardly from it. Preferably, the blades 31 are integrally formed with hub 30. Hub 30 includes a top 32 and a side wall 33 which, together, define a chamber 34. Side wall 33 has an exterior surface 35 and an interior surface 36, separated by a material thickness 40 of the side wall. Material thickness 40 may vary in other embodiments of the invention in order to provide suitable construction characteristics as may be required for blade assembly 3 applicational use. A plurality of spacers 37 are formed along the surface 36 of the side wall 33. Spacers 37 mate with the side wall 22 of cup 20 and position the cup and the blade assembly 3 with respect to one another. Preferably, the spacers 37 include radially inwardly directed projections 38. The projections 38 are designed to engage a lower edge 28 of the cup 20 during the assembly process described hereinafter. As will be appreciated by those skilled in the art, spacers 37 may vary or be eliminated, in other embodiments of the invention, so as to vary the diameter of the chamber 34, permitting that chamber to accept various sizes of the cup 20. That ease in variation enables the motor designer to utilize the same forming molds for the blade assembly 3 in a variety of motor sizes and applications, without requiring additional tooling in each instance. As will be appreciated, the projections 38 may extend from the surface 36, if desired.

Because fan assembly 3 is a molded part, it also is relatively easy to vary the design of the blades 31, again to fit the application requirement. This is an important feature of the present invention in that a designer can alter blade pitch and blade silhouette easily without requiring completely new molds for fan blade construction.

The side wall 33 has a lip 39 formed in it along the material thickness 40 of the side wall. The lip 39 forms a portion of a labyrinth seal system 100, described hereinafter.

Enclosure 4 includes a base member 50 having a side wall 51 extending axially outwardly from it. The side wall 51 defines a cylindrical upper portion 52. The portion 52 extends upwardly from a plate 53. Plate 53 is formed integrally with enclosure 4 in the embodiment illustrated. Enclosure 4 has an upper end 55 and a lower end 56, upper and lower ends being referenced to FIG. 5. The enclosure 4 delimits a generally cylindrical volume 54 between the ends 55 and 56. The plate 53 divides the volume 54 into a first chamber 57 and a second chamber 58. Plate 53 has a hub 59 extending upwardly from it. The hub 59 has an axial opening 60 through it, the opening 60 being defined by an interior wall 61. Wall 61 defines a pair of lips 62 and 63 respectively formed on opposite ends of the hub 59. The lips 62, 63 are sized to receive one each of a pair of bearings 64. A lock washer 65 and a lock washer 66 are positioned on shaft 24 to locate and hold the shaft 24 location with respect to the bearings 64 in a conventional manner, in the assembled relationship of the parts.

Chamber 57 is sized to receive motor board or motor connection assembly 9. Motor board 9 is a circuit board, at least one surface of which has a plurality of electrical connections and components associated with it. These components are illustratively indicated by the reference numeral 70. The motor board 9 has a central opening 68 formed in it, permitting the board to be dropped over the hub 59 to position the board 9 in the chamber 57. Plate 53 also has an opening 46 formed in it, which permits communication between the chamber 57 and the chamber 58.

Chamber 58 is sized to receive the motor control assembly 10. The control assembly 10 includes a circuit board 75 having a plurality of components associated with it, generally illustratively indicated by the reference numeral 76. Details of the control portions of the motor assembly 1 are contained in the above referenced copending application Ser. No. 237,782/08 incorporated herein by reference.

As best shown in FIG. 1, the base 50 is formed to define a connector block 80. Block 80 is sized to receive a plurality of male electrical connectors 81. The connectors 81 are attached to the board 75 in a conventional manner, and define the input power connection for the motor assembly 1. An electrical connection 90 extends between the motor board 9 and the board 75 through the opening 46 in the plate 53. Again, various features of the connection are described in the copending applications incorporated herein by reference. It is here noted that a board 75 generally is a high voltage input board, and the board 9 is a low voltage board from which the stator assembly 7 is operated.

The base 50 also defines a plurality of mounting pads 85 by which the motor assembly 1 is attached to its intended application.

The cover 5 is sized to close the chamber 58. The cover 5 includes a plurality of mounting devices 82 which are intended to be received in suitable receptacles 92 formed in the base 50 in a snap fit relationship. When so positioned, the cover 5 closes the chamber 58. While other closure constructions are compatible with the broader aspects of the invention, details of a preferred closure are contained in copending application Ser. No. 240,633/08.

Figure 3:
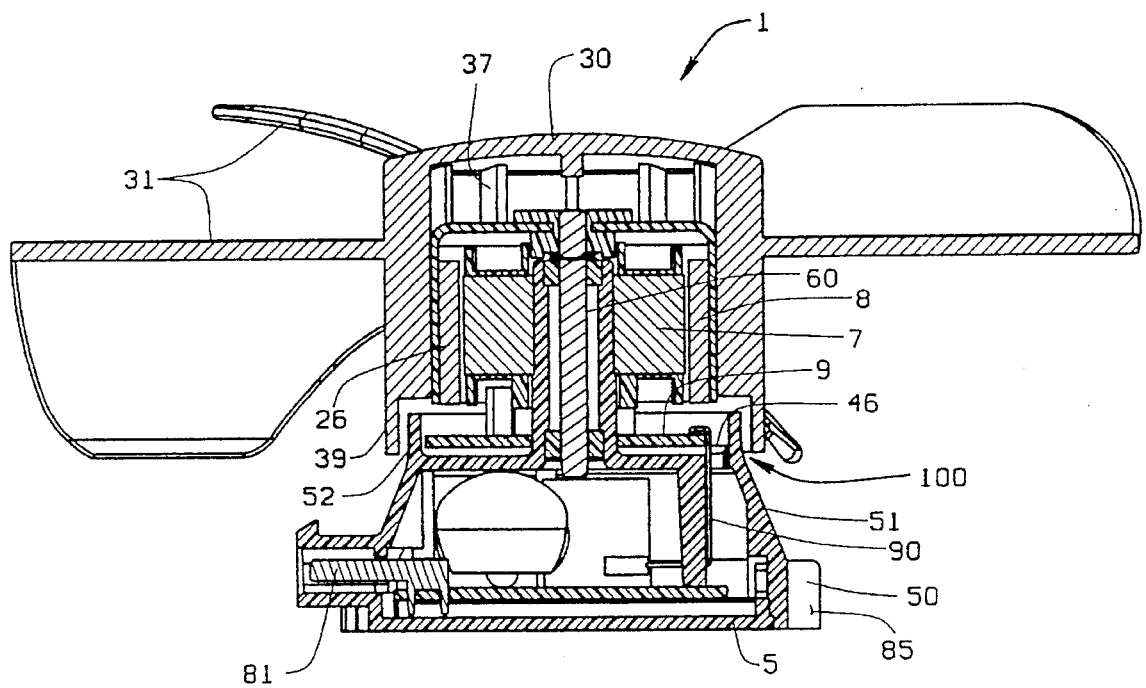
FIG. 3 is a sectional view taken along the 3—3 of FIG. 2.
Figure 4:
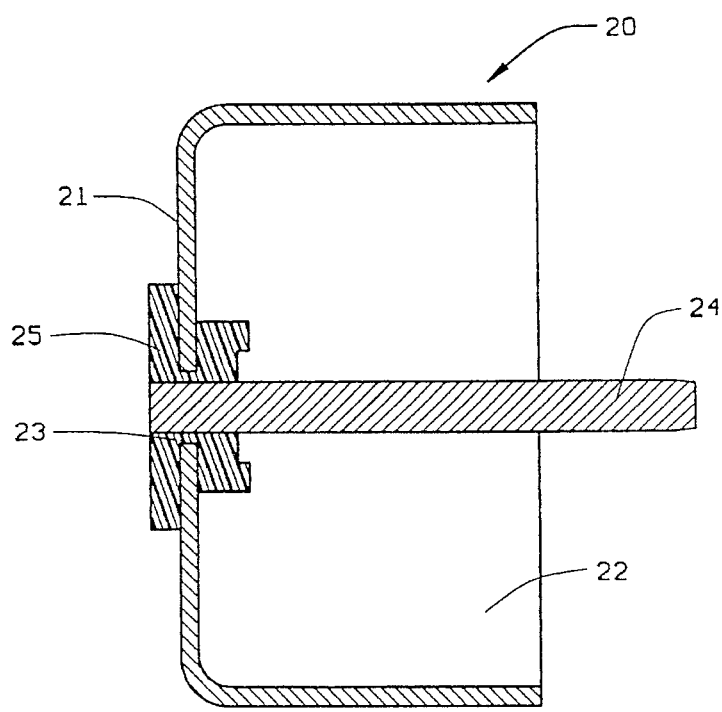
FIG. 4 is an enlarged, sectional view rotated ninety degrees with respect to FIG. 3, showing a partial construction of a rotor assembly for the motor of FIG. 1.

As shown in FIG. 3, in the assembled relationship of the various parts shown exploded in FIG. 5, the lip 39 of the side wall 33 overlaps the portion 52 of the base 50. That overlap defines a movable labyrinth seal system 100 which keeps the chamber 57 and the remaining motor structural components free from any associated environmental contaminants the motor assembly 1 may encounter in applicational use.

As is apparent from the above description, the motor assembly 1 is constructed entirely without the use of threaded fasteners or other similar mechanical types of fasteners. In addition, the construction of the assembly 1 is substantially simplified and may be automated in a number of respects. The cap 20 shaft 24 combination is constructed, and the stator assembly 7 insulated and wound. As described in application Ser. No. 240,633/08, and shown in FIG. 6, motor winding turn ends 18 are associated with the winding termination 17 of the insulation system 16 employed with the stator assembly 7. That permits the stator assembly to be plugged into the board 9, thereby making the electrical connection between the windings 15 of the stator assembly 7 and the board 9 merely by that interconnection. Both the stator assembly 7 and the board 9 are placed over the hub 59 in the assembled relationship of those components, and the ability to interconnect the components as described greatly facilitates the manufacturing and assembly process. Interconnection maybe accomplished either before or after board and stator placement. Likewise, use of the connection 90 permits the board 75 to be interconnected to the connection 90 again, merely by the placement of the board 75 into the chamber 58. Toward that end, an electrical interconnect 95 may be formed integrally with the plate 53 to position the connection 90 with respect to the board 75. The attachment of the male electrical connections 81 directly to the board 75 and their extension through block 80 again, is accomplished merely by component placement. The arrangement permits automation of motor assembly manufacture in a way not available with prior art motor construction techniques. Details of the interconnection, again, are contained in copending Ser. No. 240,633/08.

Figure 10:
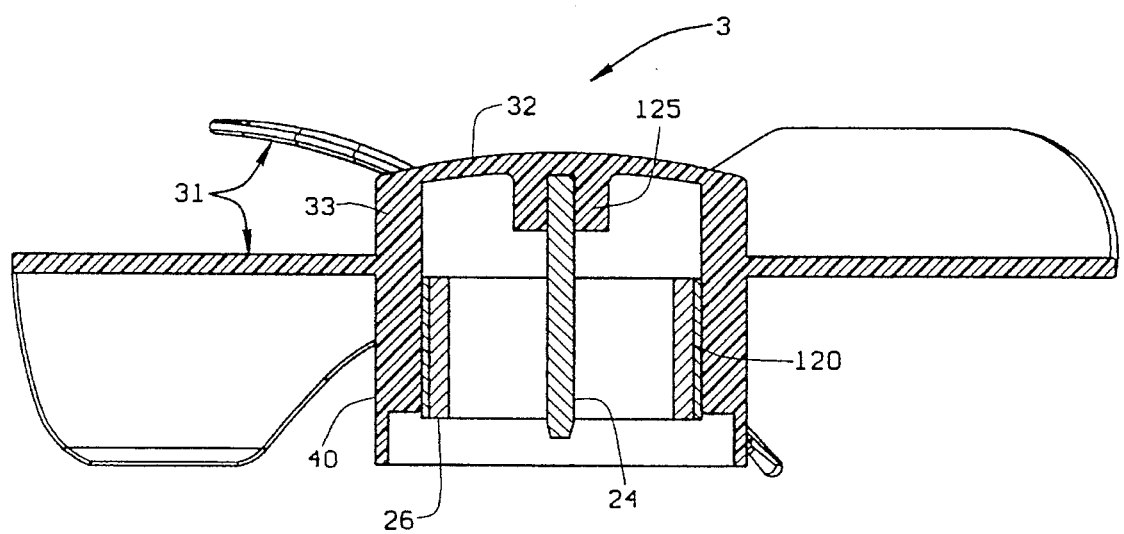
FIG. 10 is a sectional view of a second illustrative embodiment of an integral blade for the motor assembly of this invention.

Referring now to FIG. 10, a second illustrative embodiment of integral blade assembly of this invention is shown in cross section. Like reference numerals indicate like components, where appropriate. A primary difference between the embodiment shown in FIG. 3 and the embodiment shown in FIG. 10 is that the cup 20 becomes, in FIG. 10, merely a backing 120. The backing 120 may be formed in any variety of ways. For example, the backing 120 may be segments of arcuate material; or the backing 120 may be a ring-like structure; or the backing 120 may be of a wound construction; for example. In the alternative, the magnet or magnets 26 may be molded within the thickness 40 of the side wall 33 a blade assembly 3. The molding process is less desirable presently unless some form of structure equivalent to backing 120 is provided. Use of the backing 120 is preferable because it improves motor performance, and magnet 26 retention is achieved in production quantities with conventional attachment techniques.

The top 32 of the blade assembly 3 includes a central hub 125. The shaft 24 is preferably integrally molded with the hub 125 to form the blade assembly 3. In the alternative, the shaft 24 may be ultrasonically staked or adhesively bonded, for example, to a structure similar to the hub 125 for that attachment.

Numerous variations, within the scope of the appended claims, will be apparent to those skilled in the art in light of the foregoing description and accompanying drawings. For example, the design silhouette of the motor assembly 1 may vary in other embodiments of this invention. In like manner, other mounting constructions for the assembly 1 or the component thereof may be employed. Lamination design for both the stator and rotor assemblies maybe altered, with corresponding changes in motor winding configuration. Certain materials used in the construction of various components were described as preferred. Those materials may be altered in other embodiments, if desired. Our invention is compatible with other types of motor construction, in addition to the permanent magnet motor described above. Various modifications to the blade and rotor combination will be apparent to those skilled in the art. These variations are merely illustrative.

Having thus described the invention, what is claimed and desired to be secured by Letters patent is:

1. A dynamoelectric machine having a stator assembly and a rotor assembly comprising:

a base having a side wall;

a fan assembly including a hub having a sidewall and a top wall, said side wall defining a chamber sized to receive a cup, and a plurality of spacers extending inwardly of said chamber; and radially inward projections on an end of said spacers adapted to engage an end of said cup in the mounted position of said cup; and a rotor assembly, said rotor assembly including a cup intermounted to said fan assembly, and at least one permanent magnet carried by said cup, said base and said fan assembly defining a labyrinth seal with respect to one another.

2. The dynamoelectric machine of claim 1 further including epoxy adhesive for attaching the fan assembly and the cup to one another.

3. The dynamoelectric machine of claim 2 wherein said fan assembly has at least two blades.

4. A dynamoelectric machine comprising:

a stator assembly including a core of magnetic material, and a plurality of windings carried by the core;

a rotor assembly including a shaft mounted for rotation with respect to said stator assembly, said rotor assembly including a cup having a side wall and a top wall, each of the walls having a material thickness defining an inner surface and an outer surface for said respective side and top walls, said shaft being mounted to said cup;

a fan blade assembly including a central hub having a plurality of blades extending outwardly from it, said hub defining a chamber, said chamber having a diameter sized to accept said cup, and means for varying the diameter of said chamber between a maximum diameter and a minimum diameter for enabling said blade assembly to accept a variety of cup sizes;

a base member delimiting an axial volume, said volume being divided by a plate, said plate having a hub extending axially outwardly from it, the hub having a central opening in it sized to receive said shaft, said shaft being rotatably mounted on at least one end of said hub.

5. The dynamoelectric machine of claim 4 wherein said means for varying the diameter of said chamber comprises a plurality of spacers, the maximum of diameter of said chamber being defined when said cup is flush fitting with said hub.

6. The dynamoelectric machine of claim 5 wherein said machine is a permanent magnet motor, said rotor assembly including at least one permanent magnet mounted on an interior wall of said cup.

7. The dynamoelectric machine of claim 6 wherein said shaft is attached to said cup by a cast in place molded part.

8. The dynamoelectric machine of claim 7 wherein said blade assembly and said base member define a labyrinth seal with respect to one another in their assembled relationship.

9. The dynamoelectric machine of claim 8 wherein the hub of said base includes at least one bearing for rotatably supporting said shaft.

10. A method of constructing a dynamoelectric machine comprising:

forming an enclosure having a first end and a second end, said enclosure having a shaft receiving projection extending axially outwardly along the first end thereof, said projection having an axial opening therethrough, said enclosure defining a motor connection portion and a motor control connection portion;

assembling a rotor including a member having at least one side wall, said rotor including at least one permanent magnet attached to said member;

winding a stator assembly, said stator assembly having a core, winding receiving slots formed in said core, and a central opening in said core;

placing motor connection means in said enclosure;

placing said stator assembly over the projection of said enclosure, placement of said stator assembly in said enclosure engaging said motor connection means;

placing the shaft of said rotor assembly in the projection of said enclosure;

rotatably supporting said shaft with respect to said projection;

attaching a fan assembly to said member, said fan assembly defining a labyrinth seal along the first end of said enclosure;

placing a control means in said enclosure; and placing a cover on said enclosure, said cover closing the second end of said enclosure.

11. The method of claim 10 wherein said member has an external diameter, said fan assembly includes a hub having a chamber defining an internal diameter, further including the steps of adjusting the internal diameter of said hub to accept the external diameter of said member.

12. The method of claim 11 wherein said adjustment step further includes placing a plurality of spacers between said hub and said member to adjust the internal diameter of said hub.

13. A permanent magnet motor comprising:

a stator assembly including a plurality of windings;

a rotor assembly mounted for rotation with respect to said stator assembly, said rotor assembly including a member having at least one side wall, at least one permanent magnet mounted to said side wall, and a shaft forming a one-piece assembly with said member;

a fan blade assembly mounted to at least the side wall of said member, said blade assembly including a hub attached to said member and a plurality of blades integrally formed with said member;

a base member delimiting an axial volume, said volume being divided by a plate integrally formed with said base, said plate having a hub extending axially outwardly from it, the hub having a central opening in its size to receive said shaft, said plate defining a circuit board receptacle on a first side thereof and a motor control receptacle on a second side thereof;

said base member and said fan assembly each having side walls, the side wall of said fan assembly overlapping the sidewall of said base assembly in the assembly relationship of said motor; and a cover closing the base member on the second side of said plate.

14. The motor of claim 13 wherein said shaft is attached to said rotor assembly by a cast in place molded part.

15. The motor of claim 14 further including a plurality of spacers, said spacers being positioned between said fan blade assembly and said member to position said member with respect to said fan blade assembly.

16. The motor of claim 15 wherein said member is cup shaped.

17. The motor of claim 16 wherein said member, said spacers and said blade assembly are attached to one another with an epoxy adhesive.

18. The motor of claim 17 further including the plurality of permanent magnets mounted to said member.

19. The motor of claim 18 wherein the hub of said base member defines a pair of shoulders along the axial opening in said hub, further including a pair of bearings abutting said shoulders.

20. The motor of claim 19 wherein said spacers further include hooks formed on an end thereof, said hooks being adapted to engage an edge of said cup shaped member.

21. The motor of claim 20 wherein the plate, and hub of said base member are a molded part.

* * * * *